United States Patent [19]
Tanaka et al.

[11] Patent Number: 5,613,529
[45] Date of Patent: Mar. 25, 1997

[54] METHOD AND APPARATUS FOR TREATMENT OF STATOR COIL LEAD WIRES FOR ELECTRIC ROTARY MACHINE

[75] Inventors: Hiroyuki Tanaka; Ko Onodera, both of Hitachinaka; Takehiko Watanabe, Nakamachi; Yoshinori Fukaya, Hitachinaka, all of Japan

[73] Assignee: Hitachi, Ltd., Japan

[21] Appl. No.: 589,609

[22] Filed: Jan. 22, 1996

[30]     Foreign Application Priority Data

Jan. 20, 1995  [JP]  Japan .................................. 7-007054

[51] Int. Cl.$^6$ ...................................................... B21F 1/00
[52] U.S. Cl. .......................................................... 140/71 R
[58] Field of Search ................................. 29/596, 602.1, 29/605; 72/411; 140/71 R, 92.1

[56]             References Cited

U.S. PATENT DOCUMENTS 3,166,102  1/1965  Strickland ............................ 140/71 R

FOREIGN PATENT DOCUMENTS 44-8171    3/1969   Japan .
47-29501  12/1972   Japan .
2-5647     2/1990   Japan .

*Primary Examiner*—Lowell A. Larson
*Attorney, Agent, or Firm*—Evenson, McKeown, Edwards & Lenahan, P.L.L.C.

[57]              ABSTRACT

A method and apparatus for treatment of stator coil lead wires for an electric rotary machine, in which a plurality of coil lead wires extending in the radial direction of a stator for an electric rotary machine are movably arranged between two plane-like or cylindrical-surface members opposite to each other; the plurality of coil lead wires are pressed in a predetermined gathering direction by a lead wire pressing member which is capable of moving between the two plane-like or cylindrical-surface members, so that the plurality of coil lead wires are transformed and gathered into a predetermined shape. Thus, the coil length required for treatment of the stator coil lead wires can be reduced, and the lead wire treatment can be performed quickly and automatically.

22 Claims, 13 Drawing Sheets

METHOD AND APPARATUS FOR TREATMENT OF STATOR COIL LEAD WIRES FOR ELECTRIC ROTARY MACHINE

BACKGROUND AND SUMMARY OF THE INVENTION

The present invention relates to a method and apparatus for gathering and treating lead wires of a stator coil for an electric rotary machine.

A technique for gathering stator coil lead wires is disclosed in JP-U-47-29501 or JP-Y-44-8171.

In the technique disclosed in JP-U-47-29501, a lead wire of a neutral wiring point of each phase winding in an AC generator stator is wound on and then twisted with a lead wire for rectifier wiring, and then the neutral point connection is performed.

In the technique disclosed in JP-Y-44-8171, a lead wire of a neutral wiring point of each phase winding is connected by soldering or the like to a conductor formed on a circuit sheet to reduce the length of the lead wires.

In addition, a semi-arc terminal sheet for connecting lead wires of a coil of an electric motor to lead wires of a power supply is disclosed in JP-Y-2-5647. In this terminal sheet, hooks are formed for connecting the respective lead wires, and conductors have one-end portions of which are connected to the respective hooks and the other-end portions which are connected to the power supply terminals. Accordingly, the work man hour needed for lead wire treatment is reduced.

However, in the techniques disclosed in JP-U-44-8171 and JP-Y-2-5647, a special part for connecting lead wires of a coil is necessary. Therefore, there has been a problem that the size and weight of an AC generator is increased.

In the technique disclosed in JP-U-47-29501, it is necessary for a worker to wind neutral lead wires. Also excessive winding is required for such winding of lead wires.

In addition, in the conventional manufacture of a stator of an AC electric motor, only lead wire treatment must be performed manually, and it has been a factor in preventing low-cost and short-time manufacture of the stator.

It is therefore an object of the present invention to solve the foregoing problems.

It is another object of the present invention to provide a method and apparatus for lead wire treatment of a stator coil for an electric rotary machine, in which the coil length required for lead wire treatment of the stator coil can be reduced, and the lead wire treatment can be performed quickly and automatically.

In order to attain the foregoing objects, the present invention provides, in the method of treatment of stator coil lead wires for an electric rotary machine, in which: a coil lead wires extending in the radial direction of a stator for an electric rotary machine are movably disposed between two plane-like members opposite to each other; and the coil lead wires are pressed in a predetermined gathering direction by a lead wire pressing member which is capable of moving between the two plane-like members, so that the plurality of coil lead wires are transformed and gathered into a predetermined shape.

Preferably, in the above-mentioned method of treatment of stator coil lead wires for an electric rotary machine, a fixed member is fixedly disposed between the two plane-like members, and the plurality of coil lead wires are disposed between the fixed member and the pressing member, so that the plurality of coil lead wires are transformed into a predetermined shape by moving the pressing member toward the fixed member.

Preferably, in the above-mentioned method of treatment of stator coil lead wires for an electric rotary machine, the gathered lead wires are pressed by a block-like member so as to be transformed in the center axis direction of the stator.

Preferably, in the above-mentioned method of treatment of stator coil lead wires for an electric rotary machine, a difference is formed in bending radius between the plurality of lead wires to be transformed so as to reduce the overlapping thickness of the lead wires in the transformed portion.

According to another aspect of the present invention, in the method of treatment of stator coil lead wires for an electric rotary machine: a plurality of coil lead wires extending in the radial direction of a stator for an electric rotary machine are movably disposed between two plane-like members opposite to each other; the plurality of coil lead wires are disposed between two lead wire pressing members which are capable of moving between the two plane-like members; and the plurality of coil lead wires are pressed toward a center portion between the two pressing members so that the plurality of coil lead wires are transformed and then gathered into a predetermined shape.

Preferably, in the above-mentioned method of treatment of stator coil lead wires for an electric rotary machine, two fixed members are disposed in the vicinity of a center portion between the two pressing members, and the plurality of coil lead wires are disposed between one of the fixed members and one of the pressing members and between the other one of the fixed members and the other one of the pressing members, so that the plurality of coil lead wires are transformed into a predetermined shape by moving the pressing members toward the fixed members respectively.

Preferably, in the above-mentioned method of treatment of stator coil lead wires for an electric rotary machine, the gathered lead wires are pressed by a block-like member disposed in the vicinity of the center portion between the two pressing members so as to be transformed in the center axis direction of the stator.

Preferably, in the above-mentioned method of treatment of stator coil lead wires for an electric rotary machine, a difference is formed in bending radius between the plurality of lead wires to be transformed so as to reduce the overlapping thickness of the lead wires in the transformed portion.

According to a further aspect of the present invention, the apparatus for treatment of stator coil lead wires for an electric rotary machine, comprises: two plane-like members disposed so as to be opposite to each other so that a plurality of coil lead wires extending in the radial direction of a stator for an electric rotary machine are movably supported between the two plane-like members; and a lead wire pressing member disposed so as to be movable between the two plane-like members; whereby the plurality of coil lead wires are pressed in a predetermined gathering direction by the lead wire pressing member so that the plurality of coil lead wires are transformed and gathered into a predetermined shape.

Preferably, the above-mentioned apparatus for treatment of stator coil lead wires for an electric rotary machine, further comprises a fixed member fixedly disposed between the two plane-like members, wherein the plurality of coil lead wires are disposed between the fixed member and the pressing member, so that the plurality of coil lead wires are transformed into a predetermined shape by moving the pressing member toward the fixed member.

Preferably, the above-mentioned apparatus for treatment of stator coil lead wires for an electric rotary machine further comprises a block-like member for pressing and transforming the gathered lead wires in the center axis direction of the stator.

According to a still further aspect of the present invention, the apparatus for treatment of stator coil lead wires for an electric rotary machine, comprises: two plane-like members disposed so that a plurality of coil lead wires extending in the radial direction of a stator for an electric rotary machine are supported movably between the two plate-like members; and two lead wire pressing members disposed so as to be movable between the two plane-like members; whereby the plurality of coil lead wires are disposed between the two lead wire pressing members and pressed by the two lead wire pressing members toward the center portion between the two pressing members so that the plurality of coil lead wires are transformed and then gathered into a predetermined shape.

Preferably, the above-mentioned apparatus for treatment of stator coil lead wires for an electric rotary machine, further comprises two fixed members disposed in the vicinity of a center portion between the two pressing members, whereby the plurality of coil lead wires are disposed between one of the fixed members and one of the pressing members and between the other one of the fixed members and the other one of the pressing members, so that the plurality of coil lead wires are transformed into a predetermined shape by moving the pressing members toward the fixed members respectively.

Preferably, the above-mentioned apparatus for treatment of stator coil lead wires for an electric rotary machine, further comprises a block-like member disposed in the vicinity of the center portion between the two pressing members for pressing and transforming the gathered lead wires in the center axis direction of the stator.

By holding coil lead wires between two plane-like members or two cylindrical members opposite to each other, it is possible to restrict the transforming direction of the lead wires. Further, because the lead wires are transformed by a lead wire pressing member disposed movably between the two plane-like members or the two cylindrical members, it is easy to form the lead wires into a desired shape.

In addition, because a fixed member is provided so as to be fixed between the two plane-like members or the two cylindrical members, it is possible to ensure the gathering of the lead wires by pressing the coil lead wires toward the fixed member.

Therefore, even in a stator with a plurality of coil lead wires, such as a stator for an rotary electric machine, it is possible to form the lead wires into a desired shape in the lump.

DETAILED DESCRIPTION OF THE DRAWINGS

Figure 1A:
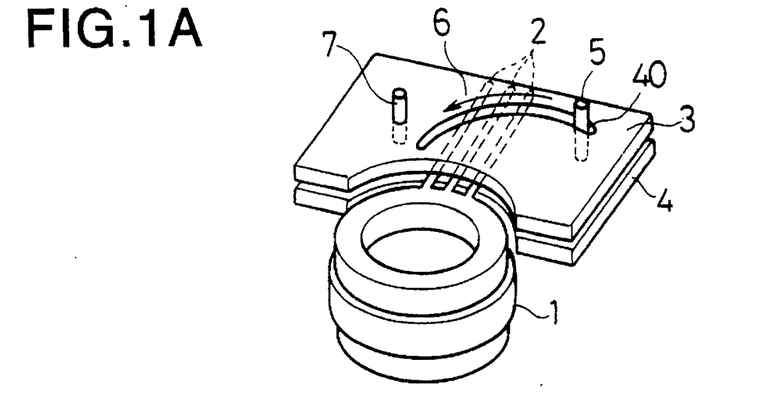
FIGS. 1A, 1B and 1C are schematic perspective views illustrating the structure of a first embodiment of the present invention.
Figure 1B:
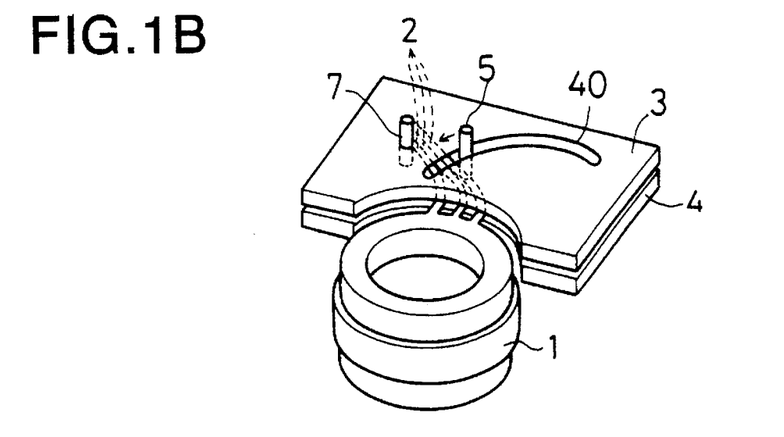
Figure 1C:
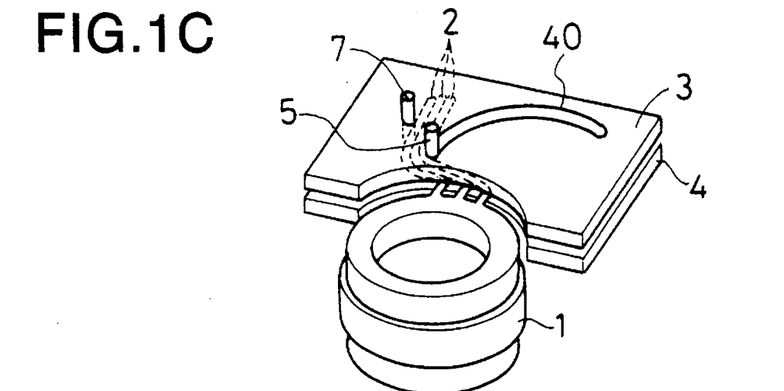

In FIGS. 1A–1C three lead wires 2 of a stator 1 for an AC electric rotary machine are movably held between a first plane member 3 and a second plane member 4. An arc-like slit 40 is formed in the plane member 3, and a groove or a slit (not-shown) shaped so as to be opposite to the slit 40 is formed in the plane member 4.

A shaping pin 5 (lead wire pressing member) supported so as to be movable along the slit 40 is inserted into the slit 40. A guide pin 7 (fixed member) is formed through the plane member 3 in the vicinity of the end of the slit 40 so as to reach the plane member 4.

In FIG. 1A, the three lead wires 2 of the stator 1 are extended in the radial direction of the stator 1. These lead wires 2 are held movably between the plane portions of the plane members 3 and 4, and thereafter the shaping pin 5 is moved in a moving direction 6 of the shaping pin 5. As shown in FIG. 1B, the lead wires 2 are made to contact the guide pin 7 so as to be gathered together. Next, as shown in FIG. 1C, if the shaping pin 5 is further moved to the end of the slit 40, the gathered lead wires 2 are shaped into an approximate L-shape as illustrated.

As has been described above, according to the first embodiment of the present invention, lead wires, even if they are short, can be gathered easily by the first plane member 3 in which the arc-like slit 40, the shaping pin 5 supported movably in this slit 40 and the guide pin 7 are formed, and the second plane member 4 in which a slit or a groove is formed so as to be opposite to the arc-like slit 40. In addition, it is thereby possible to automatically carry out the coil lead wire treatment.

Figure 2A:
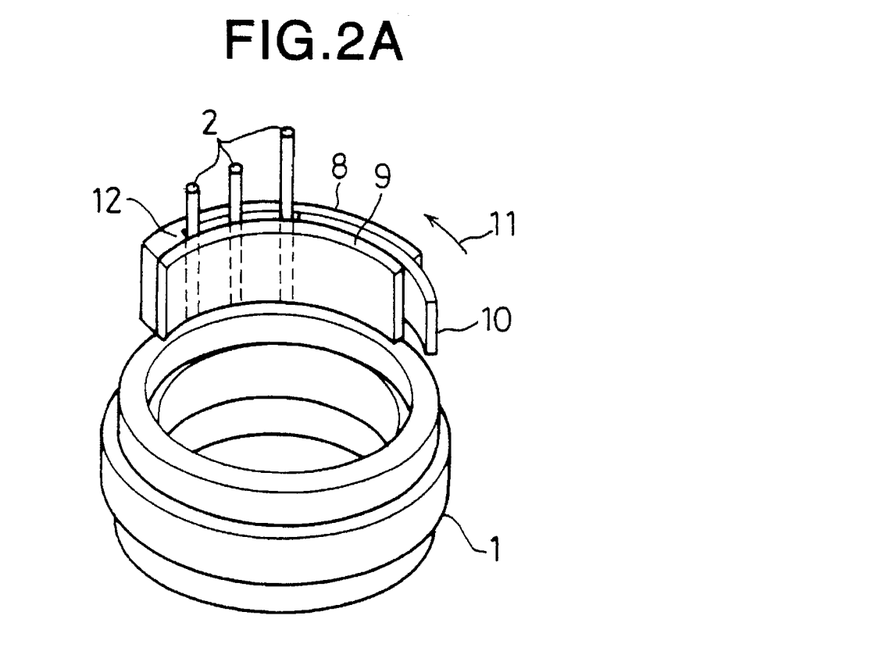
FIGS. 2A and 2B are schematic perspective views illustrating the structure of a second embodiment of the present invention.
Figure 2B:
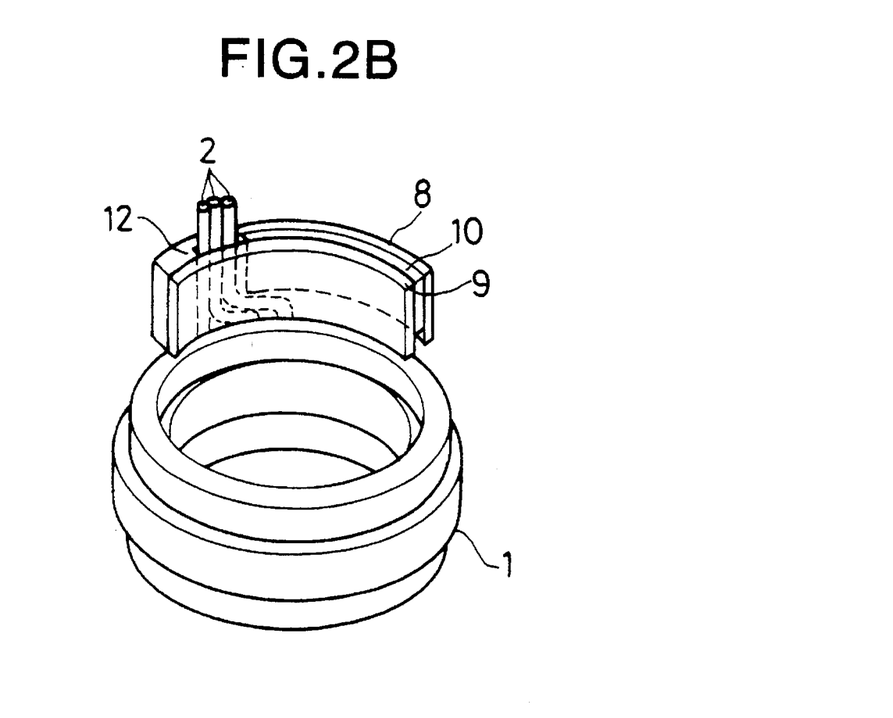

FIGS. 2A and 2B show a second embodiment of the present invention, in which lead wires 2 are extended in the center axis direction of a stator 1. A first cylindrical member 8 and a second cylindrical member 9, each of which is curved in an arc so as to have substantially the same curvature radius as the radius of the stator 1, are disposed so as to be opposite each other at a distance larger than the radius of each of the lead wires 2. A movement restriction member 12 (fixed member) contacting with the cylindrical member 9 is formed on one end portion of the cylindrical member 8. In addition, a shaping member 10 (lead wire pressing member) which is bent in an arc and is thinner than the distance between the cylindrical members 8 and 9 can be inserted between the cylindrical members 8 and 9 so as to be movable in a moving direction 11 illustrated by the arrow.

In FIG. 2A, the three lead wires 2 of the stator 1 are extended in the center axis direction of the stator 1. These lead wires 2 are held movably between the respective cylindrical portions of the cylindrical members 8 and 9, and thereafter the shaping member 10 is moved in the moving direction 11. As a result, the lead wires 2 are pressed by the shaping member 10, and moved to the position of the movement restriction member 12. FIG. 2B shows the state where the shaping member 10 has been moved so as to gather the plurality of lead wires 2 and shape those lead wires into an approximate L-shape.

As has been described above, in the second embodiment of the present invention, it is possible to obtain an effect similar to that in the first embodiment.

Figure 3A:
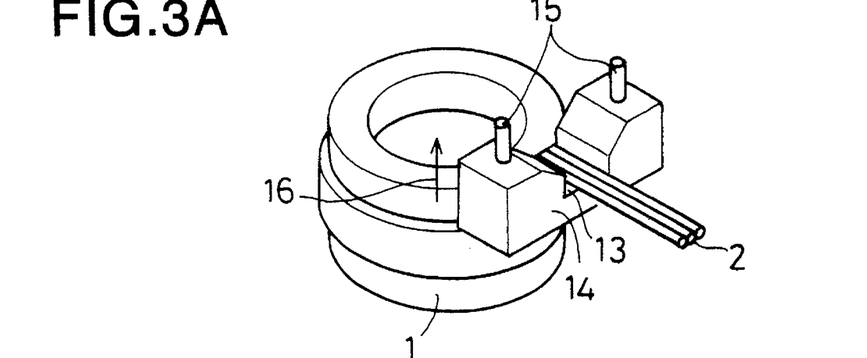
FIGS. 3A, 3B and 3C are schematic perspective views for explaining the operation in which lead wires gathered in the embodiment in FIG. 1 are shaped in the center axis direction of a stator.
Figure 3B:
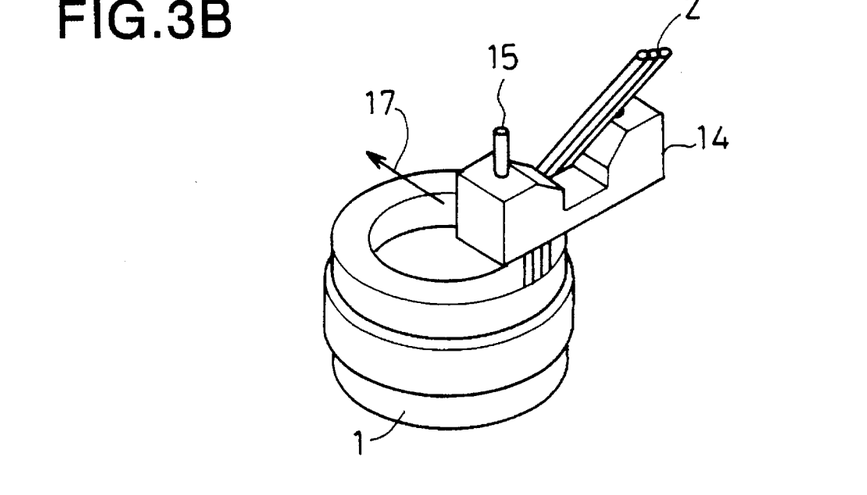
Figure 3C:
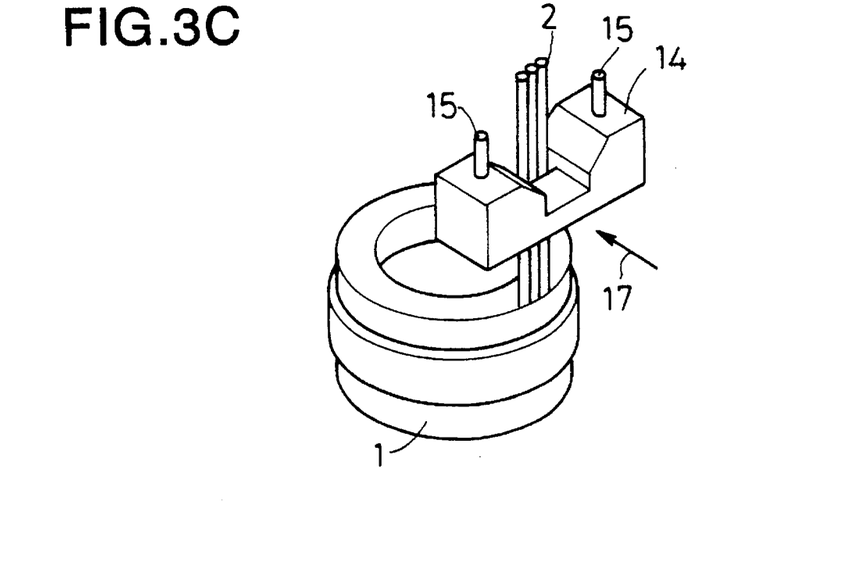

FIGS. 3A–3C show an example of the manner by which the lead wires 2 gathered and shaped in the embodiment shown in FIGS. 1A–1C are further moved so as to extend in the center axis direction of the stator 1.

First, the shaped lead wires 2 are received in a holding groove 13 of a raising block 14 as shown in FIG. 3A, and next the raising block 14 is moved in a moving direction 16, that is, in the center axis direction of the stator 1, so as to be brought into the state of FIG. 3B. Further, the raising block 14 is moved in a moving direction 17, that is, in the radial direction of the stator 1, so as to obtain such a desired shape as shown in FIG. 3C.

Figure 4A:
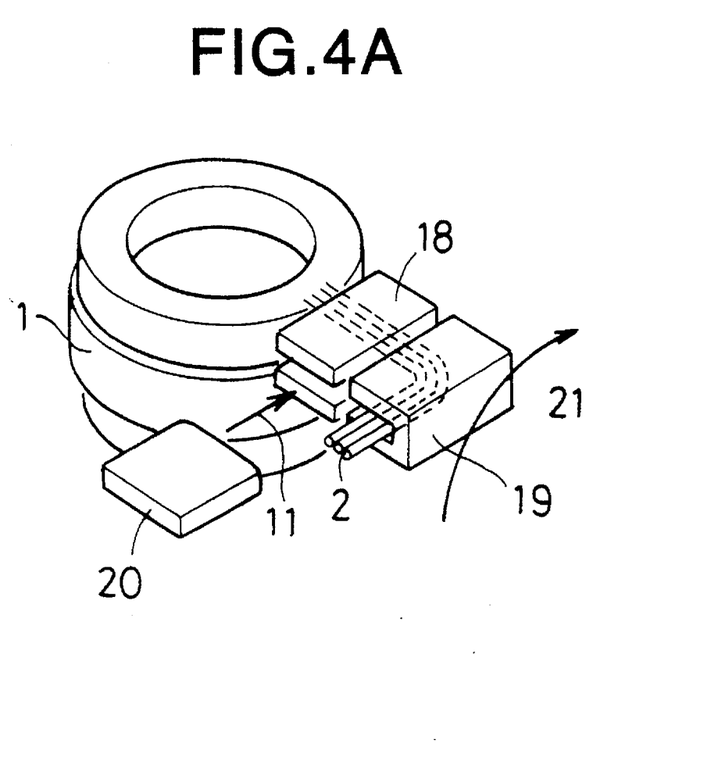
FIGS. 4A and 4B are schematic perspective views illustrating the structure of a third embodiment of the present invention.
Figure 4B:
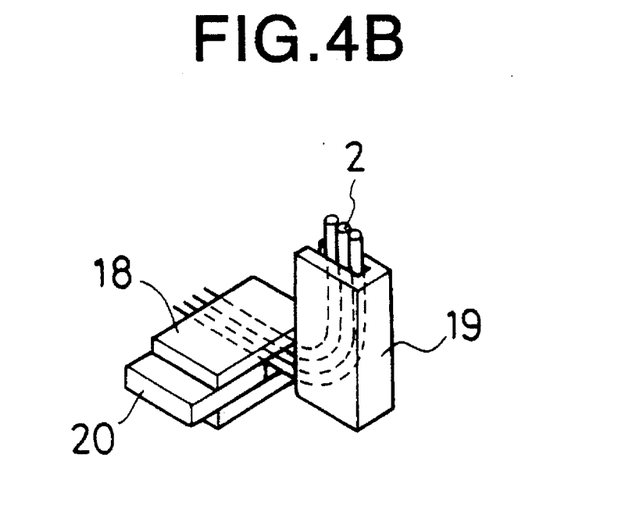

FIGS. 4A and 4B show a third embodiment of the present invention, in which gathering and shaping of lead wires 2 can be performed simultaneously in the same manner as in the embodiment shown in FIGS. 2A and 2B. In this embodiment, there are provided a two-plane member 18 having two planes and a gap therebetween, a raising block 19 having two planes and a gap therebetween, and a plate-like shaping member 20 which can be inserted between the above-mentioned two-plane gaps. The two-plane member 18 is constituted by two plane members opposite to each other and a side member connecting the two plane members, and the raising block 19 is constituted by two plane members opposite to each other and a side member connecting the two plane members. The above-mentioned two-plane gaps are larger than the diameter of the lead wires 2.

When the lead wires 2 are pressed by the shaping member 20 and inserted into the respective two-plane gaps of the member 18 and the raising block 19, the lead wires 2 are gathered and shaped into an approximate L-shape as shown in FIG. 4A. Thereafter, the raising block 19 is rotated in a rotation direction 21 so that the lead wires 2 are shaped into a desired shape bent in the center axis direction of the stator 1 as shown in FIG. 4B.

Also in this third embodiment, it is possible to obtain an effect similar to that in the first and second embodiments.

Figure 5A:
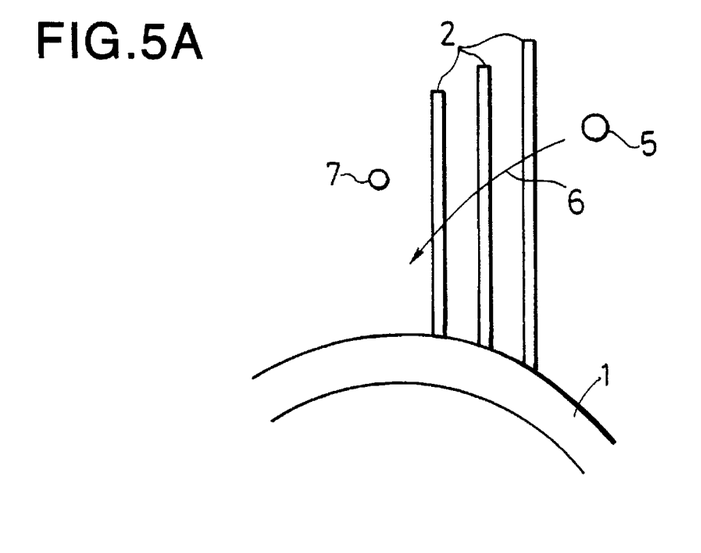
FIGS. 5A, 5B and 5C are schematic views for explaining the state of the lead wires in the gathering process of the lead wires in the first embodiment.
Figure 5B:
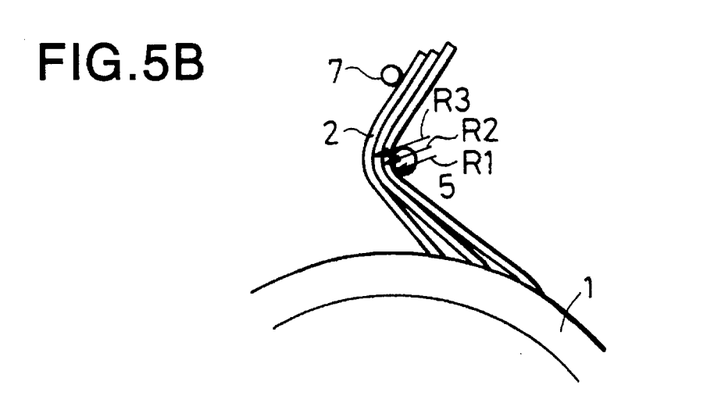
Figure 5C:
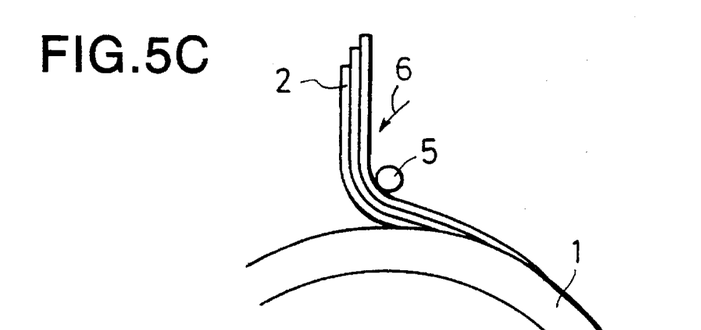

FIGS. 5A–5C show the principle in which the distance between the plane members 3 and 4 is made a little larger than the diameter of each lead wire so as to give differences in bending radius of the respective lead wires.

FIG. 5A shows the arrangement before shaping. FIG. 5B shows the state where the lead wires 2 have been shaped by the guide pin 7 and the shaping pin 5 so as to have required bending radii (R1, R2 and R3). FIG. 5C shows the state where the guide pin 7 has been detached and the shaping pin 5 has been further moved in the moving direction 6.

In the state of FIG. 5B, the three lead wires 2 overlap each other in the center axis direction of the stator 1. Therefore, the three lead wires 2 have different bending radii R1, R2 and R3 respectively. Because there is differences in bending radius, the lead wires 2 are not gathered in the state of a one-direction array, so that the lead wires 2 can be bound easily by a metal band or the like which will be described later.

Figure 6A:
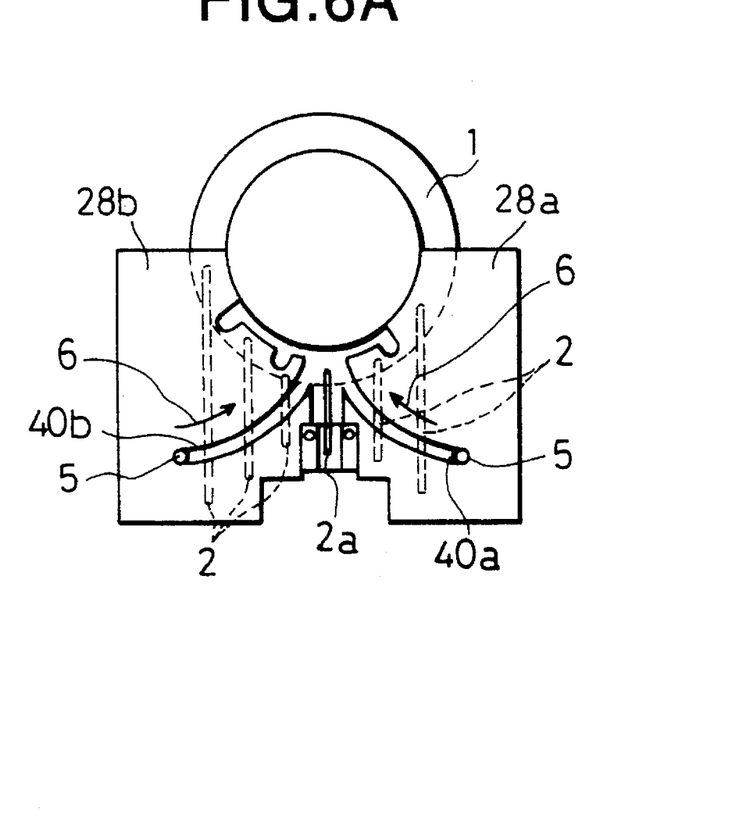
FIGS. 6A and 6B are schematic top and side views illustrating the structure of a fourth embodiment of the present invention.
Figure 6B:
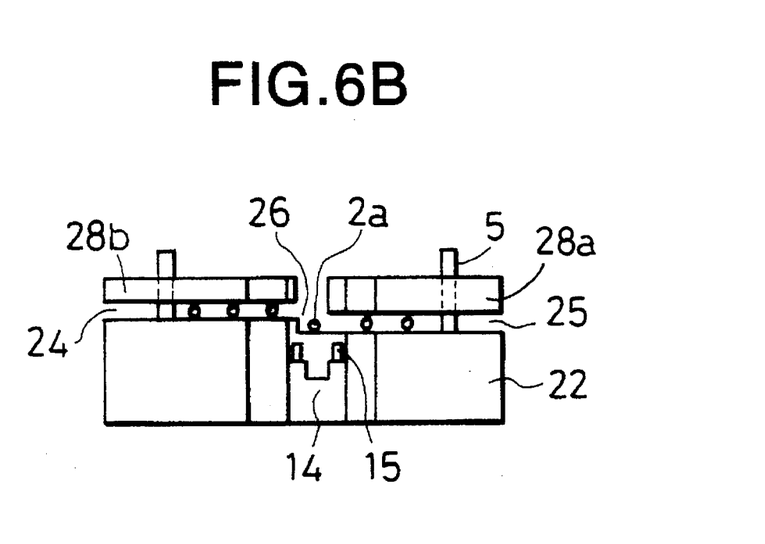

FIGS. 6A and 6B are schematic views of the structure of a fourth embodiment of the present invention, in which six lead wires are to be gathered, and those lead wires are gathered from two opposite directions. FIG. 6A is a plan view and FIG. 6B is a side view.

In a first plane member 28a, an arc-like slit 40a is formed, and a shaping pin 5 is supported so as to be movable along the slit 40a. In addition, in a second plane member 28b which is thinner than the first plane member 28a, an arc-like slit 40b is formed, and a shaping pin is supported so as to be movable along the slit 40b.

A plane member 22 has a surface facing the first and second plane members 28a and 28b. The distance between the first plane member 28a and the plane member 22 is almost the same as that between the second plane member 28b and the plane member 22, and the distance is a little larger than the diameter of each of the lead wires 2. The lead wires 2 are disposed on different planes 24 and 25 in accordance with their gathering directions.

That is, the planes 24 and 25 have a height difference 26 which is larger than the diameter of each lead wire, so that the shaping pin 5 can move in the moving direction 6 along a groove formed in the plane member 28 without receiving the interference of the right and left lead wires 2. When the shaping pin 5 is moved to shape the lead wires 2, a raising block 14 having a guide pin 15 (fixed member) moves up to the position where the guide pin 15 fulfills the same function as the guide pin 7 shown in FIGS. 5A–5C, that is, where the lead wires 2 are stopped. After that, the raising pin 14 moves down to the height where the raising pin 14 does not interfere with the lead wires 2.

Figure 7:
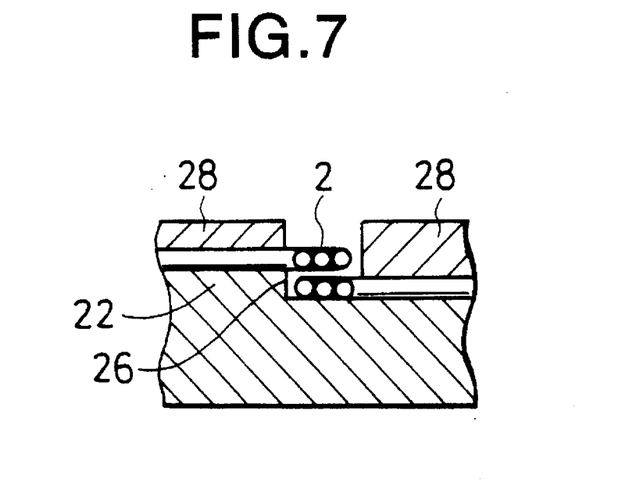
Fig. 7 is a partially sectional view illustrating the state where the lead wires have been gathered in the embodiment of FIGS. 6A and 6B.

FIGS. 6A and 6B show the state where the raising block 14 moves down. FIG. 7 shows a section in which the shaping pin 5 has been moved in the moving direction 6 from the state shown in FIGS. 6A and 6B so as to gather the lead wires 2.

The raising block 14 in the state shown in FIG. 7 moves up, and operates in the same manner as the operation shown in FIGS. 3A–3C.

Also in this fourth embodiment of the present invention, it is possible to obtain an effect similar to that in the first embodiment.

Figure 8:
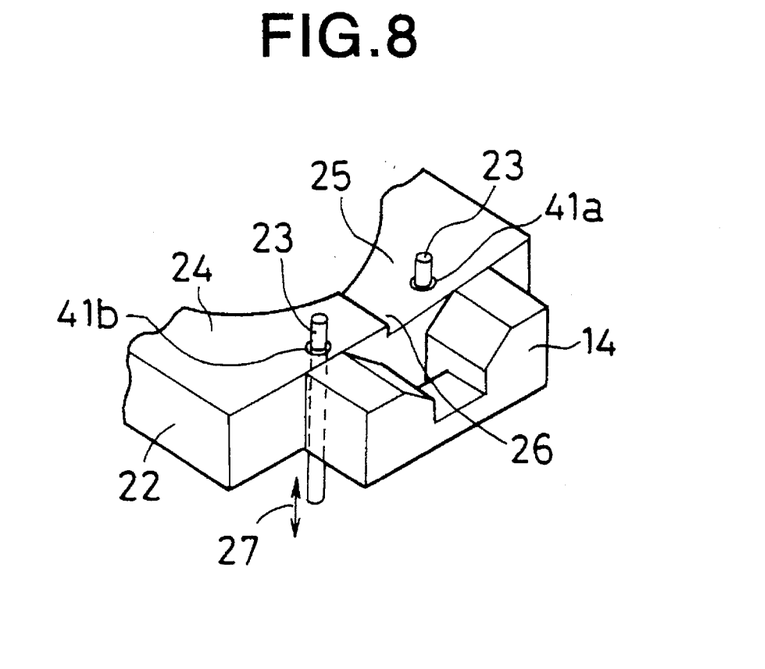
FIG. 8 is a schematic perspective view illustrating a modification in the fourth embodiment.

FIG. 8 shows a modification of the embodiment shown in FIGS. 6A and 6B. In FIG. 8, the raising block 14 does not have the guide pin 15. Instead of this guide pin 15, through holes 41a and 41b are provided in the plane member 22, and guide pins 23 (fixed member) project from the through holes 41a and 41b. That is, the guide pins 23 are made to project from the through holes 41a and 41b when the lead wires 2 are gathered, and thereafter the pins 23 are moved down.

With such a configuration, it is only necessary to move the raising block 14 when the gathered lead wires 2 are bent in the center axis direction of the stator 1.

Figure 9A:
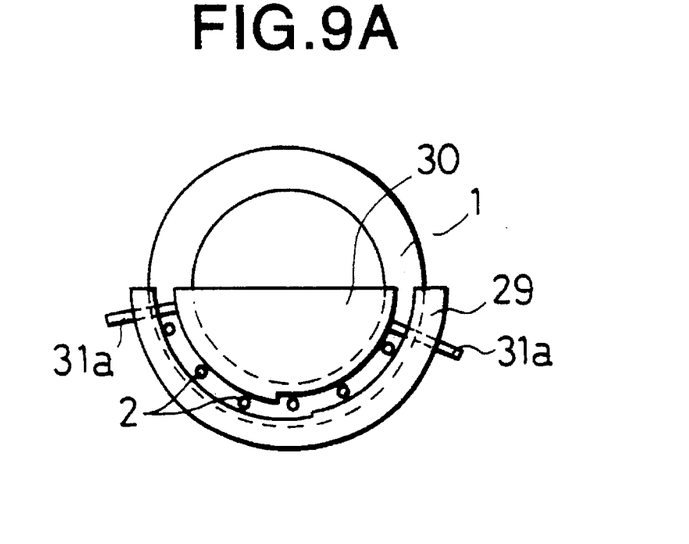
FIGS. 9A and 9B are schematic top and side views illustrating the structure of a fifth embodiment of the present invention.
Figure 9B:
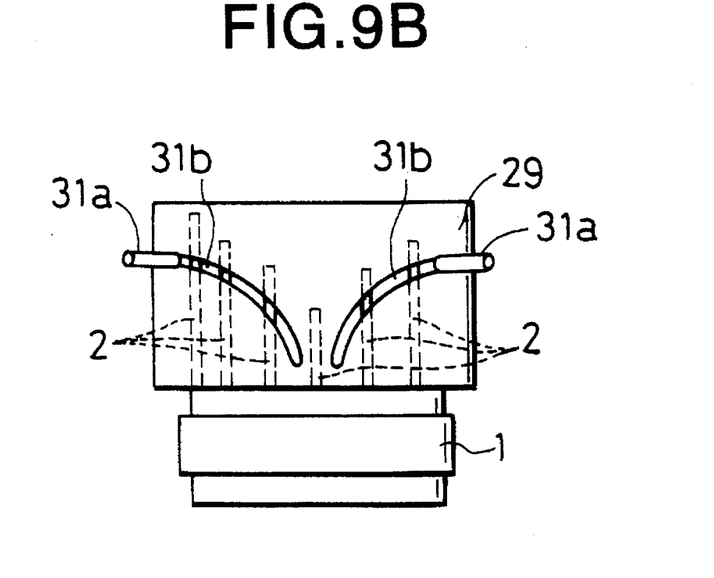

FIGS. 9A and 9B are schematic views illustrating the structure of a fifth embodiment of the present invention. The lead wires 23 extending in the radial direction of the stator 1 are held between a cylindrical member 29 and a semi-cylindrical member 30. The cylindrical member 29 has almost the same radius of curvature as the radius of the stator 1, and the semi-cylindrical members has an outer circumferential surface having the same radius of curvature as that of the inner circumference surface of the cylindrical member 29 and being opposite to the above-mentioned inner circumference surface.

Two arc-like slits 31b are formed in the cylindrical member 29, and slits or grooves (not-shown) are formed in the semi-cylindrical member 30 opposite the two slits 31b. These slits 31b are shaped so as to approach the stator 1 gradually in the direction where the lead wires 2 are gathered.

Shaping pins 31a (lead wire pressing members) are provided so as to be movable along the slits 31b and 31b while they are supported by the two slits 31b and 31b and the slits or grooves formed in the semi-cylindrical member 30 respectively. The plurality of lead wires 2 can be gathered and shaped in a predetermined position by moving these shaping pins 31a in the directions where the lead wires 2 are gathered.

Figure 10:
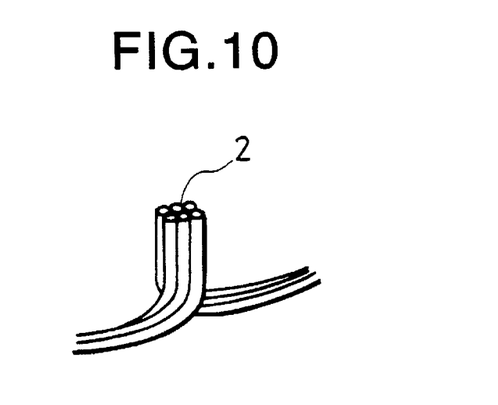
FIG. 10 is a schematic perspective view illustrating the appearance of the lead wires gathered in the fifth embodiment.

In addition, a step is formed in each of the inner circumference surface of the cylindrical member 29 and the outer circumference surface of the semi-cylindrical member 30 as shown in FIGS. 9A and 9B. This step prevents all the lead wires 2 from being arrayed in one direction when the lead wires 2 are gathered. Because of this step, a plurality of lead wires 2, for example, six lead wires 2 as shown in FIG. 10 are arranged three by three in two lines in the circumferential direction of the stator 1 when the lead wires 2 are gathered.

Also in this fifth embodiment of the present invention described above, it is possible to obtain an effect similar to that in the first embodiment.

Figure 11:
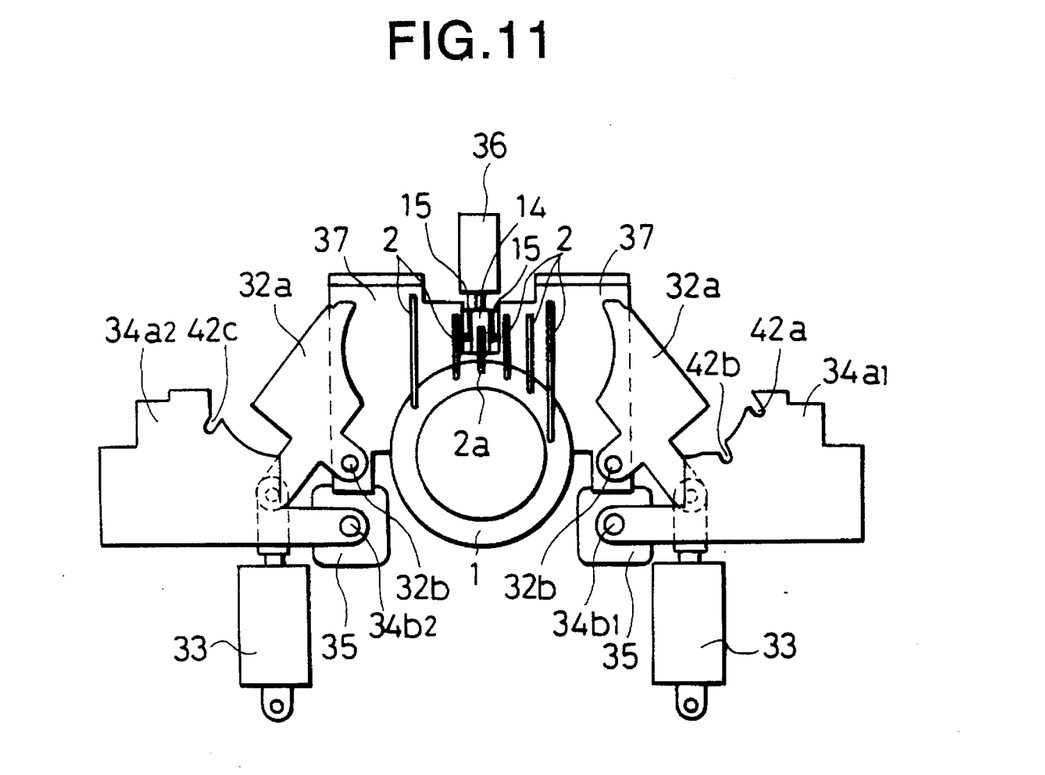
FIG. 11 is a schematic top view illustrating the structure of a sixth embodiment of the present invention.

In FIG. 11, lead wires 2 of a stator 1 are disposed on plane members 37 and 37' having two planes which are different in height. Plane members 34a1 and 34a2 which form a space for holding the lead wires 2 together with the plane members 37 and 37' are rotated by rotary actuators 35 and centering hinges 34b1 and 34b2 as their center axes of rotations. In these plane members 34a1 and 34a2, notches 42a, 42b and 42c are formed. These notches 42a, 42b and 42c are provided so as to receive lead wires (extending in the center axis direction of the stator 1) which are lead wires not to be gathered.

Blades 32a and 32a' (lead wire pressing members) corresponding to the shaping pin 5 in FIGS. 5A–5C are driven and rotated by cylinders 33 and 33', centering hinges 32b and 32b' as their center axes of rotations respectively. These blades 32a and 32a' move between the plane members 37 and 37' and the plane members 34a1 and 34a2 so as to press the lead wires 2.

Figure 12A:
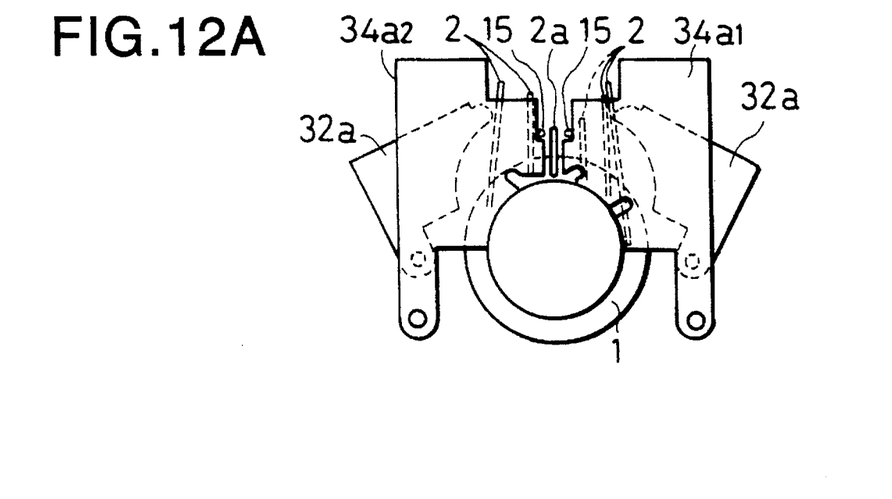
FIGS. 12A, 12B and 12C are schematic top views for explaining the operation in the lead wire gathering process in the sixth embodiment.
Figure 12B:
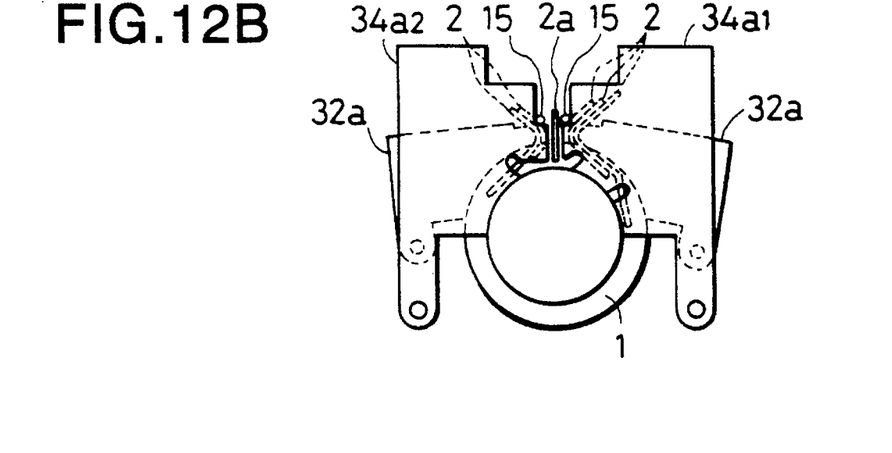
Figure 12C:
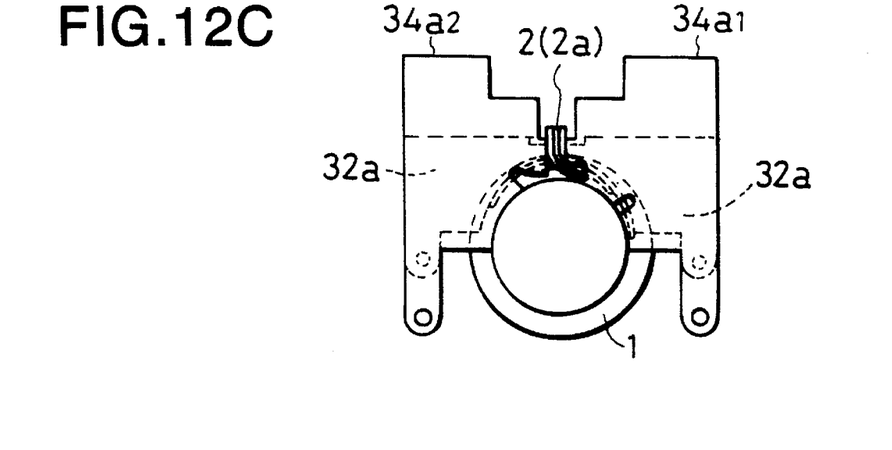

Guide pins 15 and 15 corresponding to the guide pin 7 in FIGS. 5A–5C are formed integrally with a raising block 14, and are driven by a cylinder (not shown) in the direction perpendicular to the paper of FIGS. 12A–12C, that is, in the center axis direction of the stator 1. The raising block 14 is driven in the direction perpendicular to the paper of FIG. 11 by a cylinder 36. FIG. 11 shows the state in which the lead wires 2 of the stator 1 are not yet gathered.

FIGS. 12A–12C are schematic views for explaining the operation in the gathering process of the lead wires 2 in the embodiment of FIG. 11, in which portions are not illustrated. FIGS. 13A–13E are schematic views for explaining the gathering state of the lead wires 2 which are gathered in accordance with the embodiment of FIG. 11. Further, FIGS. 14A–14D are schematic perspective views for explaining the case where the lead wires 2 are gathered by use of the embodiment of FIG. 11, showing the state of the lead wires 2 of the stator 1.

The operation of the embodiment of FIG. 11 will be described with reference to FIGS. 12A–12C, FIGS. 13A–13E and FIGS. 14A–14D.

Figure 13A:
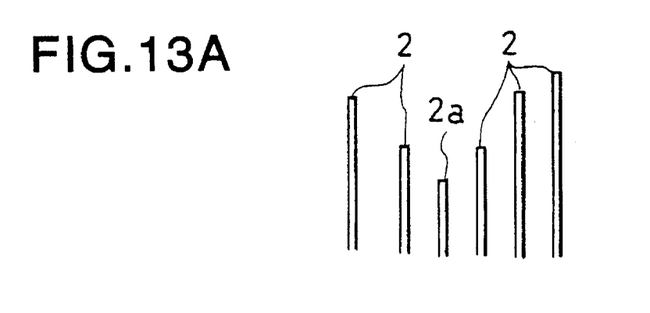
FIGS. 13A, 13B, 13C, 13D and 13E are schematic views for explaining the state of the lead wires in the lead wire gathering process in the sixth embodiment.
Figure 13B:
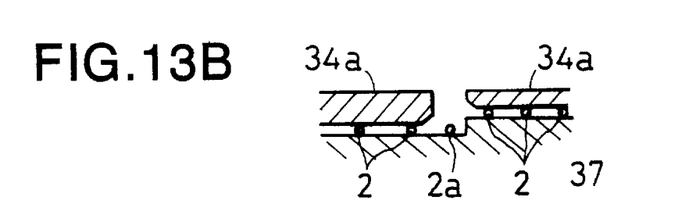
Figure 14A:
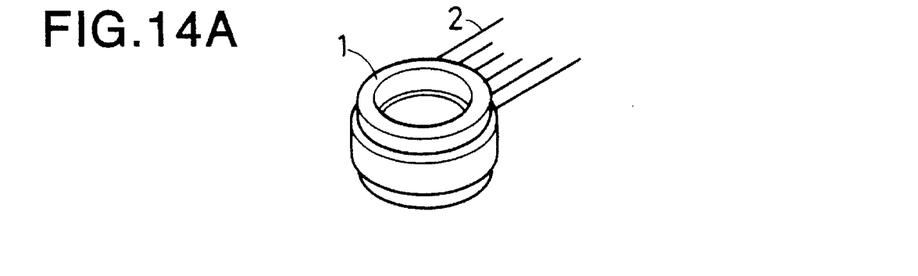
FIGS. 14A, 14B, 14C and 14D are schematic perspective views illustrating the simplified appearance of the lead wires and a stator in the lead wire gathering process in the sixth embodiment.

FIG. 13A shows the state of the lead wires 2 in the embodiment of FIG. 11. FIG. 14A shows the state of the stator 1 and the lead wires 2 in the embodiment of FIG. 11. The gathering state of the lead wires 2 changes from the state of FIG. 11 to the state of FIG. 12A. That is, the plane members 34a1 and 34a2 are rotated so that the lead wires 2 are held by the plane members 34a1 and 34a2, and 37 and 37', and the degree of freedom of the lead wires 2 is restricted. FIG. 13B shows a section at that time.

Next, the blades 32a and 32a' are rotated to bring the lead wires 2 into the state of FIG. 12B, where the lead wires 2 are gathered and shaped from the right and left of the drawing by the blades 32a and 32a'. At this time, the guide pins 15 are made to project over the block 14, so that the lead wires 2 are shaped into a desired shape by the guide pins 15 and the blades 32a. The third lead wire 2a in the left shown in FIG. 13A is not shaped because the lead wire 2a is in the center of the gathering position.

Figure 13C:
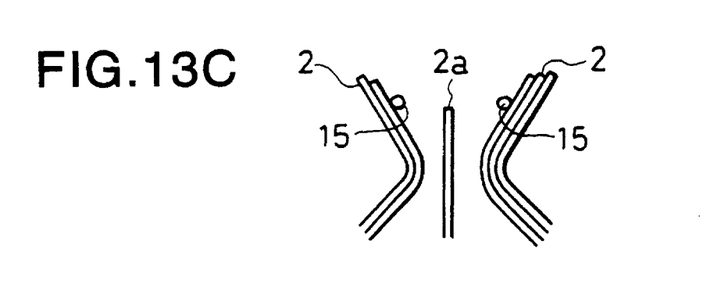
Figure 14B:
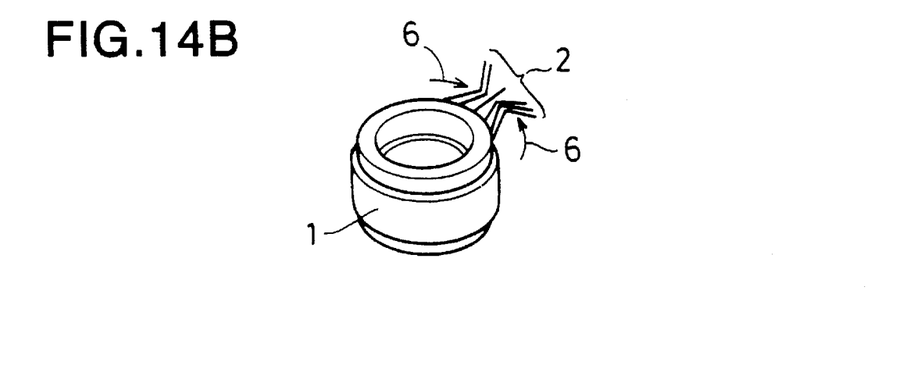

FIG. 13C and FIG. 14B show the states of the stator 1 and the lead wires 2 and 2a in FIG. 12B.

Figure 13D:
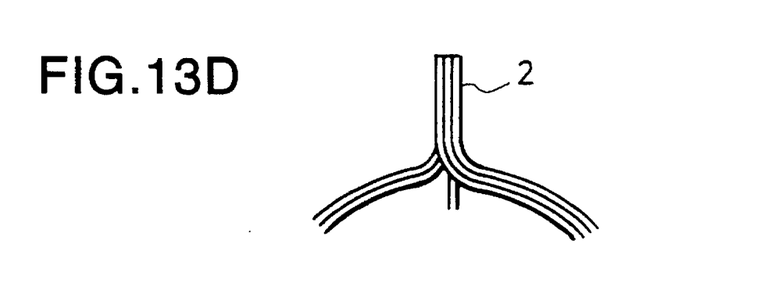
Figure 13E:
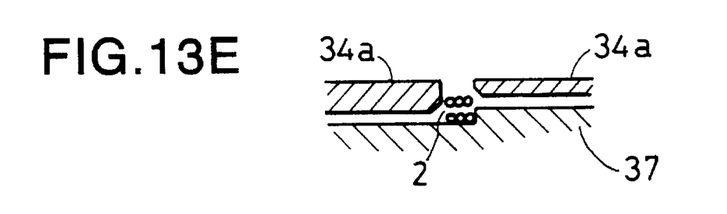
Figure 14C:
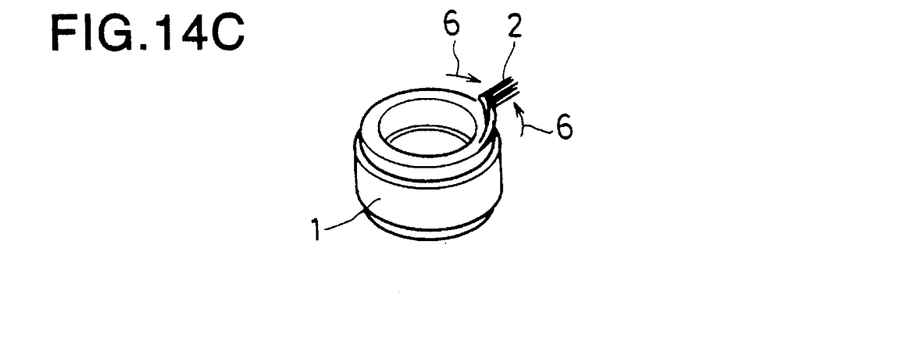

Next, the blades 32a and 32a are further rotated, to thereby bring the lead wires 2 and 2a into the state shown in FIG. 12C. FIGS. 13D and FIG. 14C show the states of the stator 1 and the lead wires 2 and 2a in FIG. 12C, and FIG. 13E shows a section of FIG. 12C. As illustrated, the six lead wires 2 and 2a are first gathered three by three into two sets, and shaped into an approximate L-shape. After that, the lead wires 2 and 2a made into two sets, three by three, are gathered so that lead wires in one of the sets overlap lead wires in the other set in the center axis direction of the stator 1.

Figure 14D:
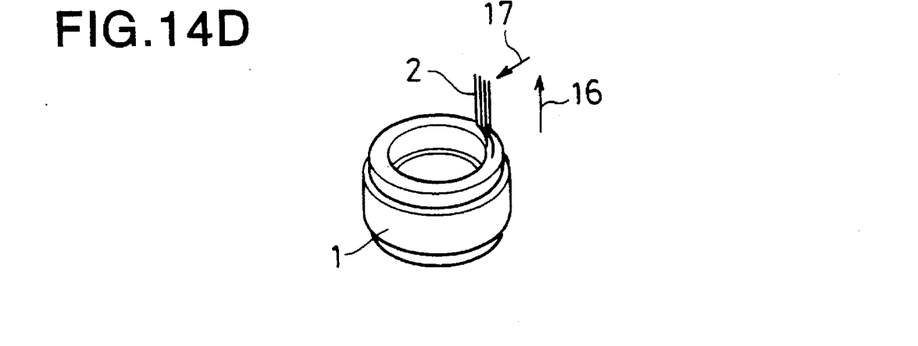

The process of gathering is completed then. In this embodiment, a part of the lead wires 2 is further raised in the direction perpendicular to the gathering direction, that is, in the center axis direction of the stator 1, by the raising block 14 and so on. FIG. 14D shows that state. This raising is performed by the raising block 14 in the same manner as that in the embodiment shown in FIGS. 3A–3C.

Figure 15:
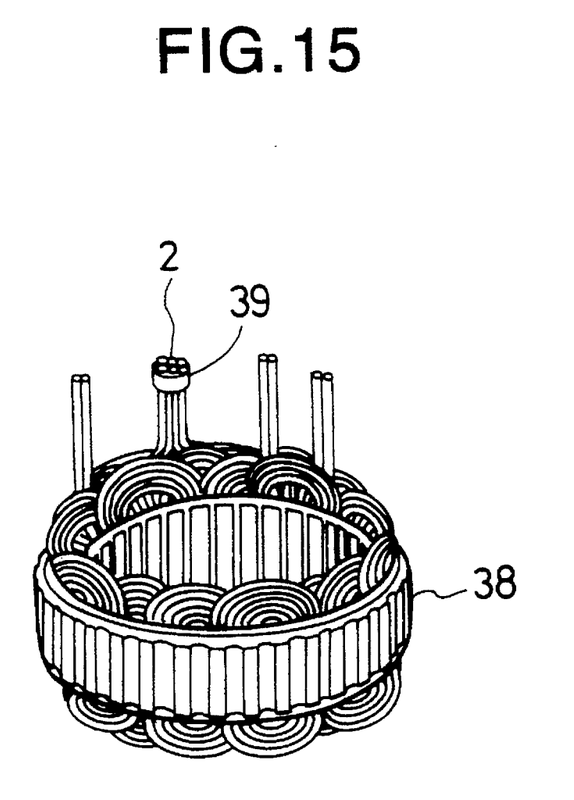
FIG. 15 is a schematic perspective view illustrating the appearance of a stator for AC generator for vehicle, the sixth embodiment.

FIG. 15 shows the appearance of a stator 38 for an AC generator for vehicle after the lead wires 2 are gathered and shaped in accordance with the embodiment shown in FIG. 11. In this embodiment, the gathered and shaped portions of the lead wires 2 are bound and fixed by a band 39 consisting of a conductive member such as metal.

As has been described, also in the sixth embodiment of the present invention, it is possible to obtain an effect similar to that in the first embodiment.

The present invention having such a structure has the following effects.

In the method of treatment of stator coil lead wires for an electric rotary machine, a plurality of coil lead wires extending in the radial direction of a stator for an electric rotary machine are movably disposed between two plane-like members opposite to each other; and the plurality of coil lead wires are pressed in a predetermined gathering direction by a lead wire pressing member which is capable of moving between the two plane-like members, so that the plurality of coil lead wires are transformed and gathered into a predetermined shape.

It is therefore possible to realize a method for lead wire treatment of a stator coil for an electric rotary machine, in which the coil length required for lead wire treatment of the stator coil can be reduced, and the lead wire treatment can be performed in a short time and automatically.

In addition, in the above-mentioned method of treatment of stator coil lead wires for an electric rotary machine, a fixed member is fixedly disposed between the two plane-like members, and the plurality of coil lead wires are disposed between the fixed member and the pressing member, so that the plurality of coil lead wires are transformed into a predetermined shape by moving the pressing member toward the fixed member.

In addition, the apparatus for treatment of stator coil lead wires for an electric rotary machine, comprises: two plane-like members disposed so as to be opposite to each other so that a plurality of coil lead wires extending in the radial direction of a stator for an electric rotary machine are movably supported between the two plane-like members; and a lead wire pressing member disposed so as to be movable between the two plane-like members; whereby the plurality of coil lead wires are pressed in a predetermined gathering direction by the lead wire pressing member so that the plurality of coil lead wires are transformed and gathered into a predetermined shape.

It is therefore possible to realize an apparatus for lead wire treatment for a stator coil for an electric rotary machine, in which the coil length required for lead wire treatment of the stator coil can be reduced, and the lead wire treatment can be performed in a short time and automatically.

In addition, the apparatus for treatment of stator coil lead wires for an electric rotary machine, further comprises a fixed member fixedly disposed between the two plane-like members, wherein the plurality of coil lead wires are disposed between the fixed member and the pressing member, so that the plurality of coil lead wires are transformed into a predetermined shape by moving the pressing member toward the fixed member. It is therefore possible to ensure the gathering of the coil lead wires.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method of treatment of stator coil lead wires for an electric rotary machine, comprising the steps of:

movably arranging a plurality of coil lead wires between opposed plane-like members, said coil lead wires extending in the radial direction of a stator for an electric rotary machine; and pressing said plurality of coil lead wires in a predetermined gathering direction by a lead wire pressing member which is capable of moving between said plane-like members, so that said plurality of coil lead wires are transformed and gathered into a predetermined shape.

2. A method of treatment of stator coil lead wires for an electric rotary machine according to claim 1, wherein a fixed member is fixedly arranged between said plane-like members, and said plurality of coil lead wires are arranged between said fixed member and said pressing member, so that said plurality of coil lead wires are transformed into a predetermined shape by moving said pressing member toward said fixed member.

3. A method of treatment of stator coil lead wires for an electric rotary machine according to claim 2, wherein said gathered lead wires are pressed by a block-like member so as to be transformed in the center axis direction of said stator.

4. A method of treatment of stator coil lead wires for an electric rotary machine according to claim 3, wherein a difference is formed in bending radius between said plurality of lead wires to be transformed so as to reduce the overlapping thickness of said lead wires in the transformed portion.

5. A method of treatment of stator coil lead wires for an electric rotary machine, comprising the steps of:

movably arranging a plurality of coil lead wires between opposed cylindrical-surface members, said coil lead wires extending in the center axis direction of a stator for an electric rotary machine; and pressing said plurality of coil lead wires in a predetermined gathering direction by a lead wire pressing member which is capable of moving between said cylindrical-surface members, so that said plurality of coil lead wires are transformed and gathered into a predetermined shape.

6. A method of treatment of stator coil lead wires for an electric rotary machine according to claim 5, wherein a fixed member is fixedly arranged between said cylindrical-surface members, and said plurality of coil lead wires are disposed between said fixed member and said pressing member, so that said plurality of coil lead wires are transformed into a predetermined shape by moving said pressing member toward said fixed member.

7. A method of treatment of stator coil lead wires for an electric rotary machine according to claim 6, wherein a difference is formed in bending radius between said plurality of lead wires to be transformed so as to reduce the overlapping thickness of said lead wires in the transformed portion.

8. A method of treatment of stator coil lead wires for an electric rotary machine, comprising the steps of:

movably arranging a plurality of coil lead wires between opposed plane-like members, said coil lead wires extending in the radial direction of a stator for an electric rotary machine;

arranging said plurality of coil lead wires between lead wire pressing members which are capable of moving between said plane-like members; and pressing said plurality of coil lead wires toward a center portion between said pressing members, so that said plurality of coil lead wires are transformed and then gathered into a predetermined shape.

9. A method of treatment of stator coil lead wires for an electric rotary machine according to claim 8, wherein fixed members are arranged in the vicinity of a center portion between said pressing members, and said plurality of coil lead wires are arranged between one of said fixed members and one of said pressing members and between the other one of said fixed members and the other one of said pressing members, so that said plurality of coil lead wires are transformed into a predetermined shape by moving said pressing members toward said fixed members respectively.

10. A method of treatment of stator coil lead wires for an electric rotary machine according to claim 9, wherein said gathered lead wires are pressed by a block-like member disposed in the vicinity of the center portion between said pressing members so as to be transformed in the center axis direction of said stator.

11. A method of treatment of stator coil lead wires for an electric rotary machine according to claim 10, wherein a difference is formed in bending radius between said plurality of lead wires to be transformed so as to reduce the overlapping thickness of said lead wires in the transformed portion.

12. A method of treatment of stator coil lead wires for an electric rotary machine, in which:

movably plurality of coil lead wires between opposed cylindrical-surface members, said coil lead wires extending in the center axis direction of a stator for an electric rotary machine;

arranging said plurality of coil lead wires between lead wire pressing members which are capable of moving between said cylindrical-surface members; and pressing said plurality of coil lead wires toward a center portion between said pressing members, so that said plurality of coil lead wires are transformed and then gathered into a predetermined shape.

13. A method of treatment of stator coil lead wires for an electric rotary machine according to claim 12, wherein a difference is formed in bending radius between said plurality of lead wires to be transformed so as to reduce the overlapping thickness of said lead wires in the transformed portion.

14. An apparatus for treatment of stator coil lead wires for an electric rotary machine, comprising:

opposed plane-like members arranged so that a plurality of coil lead wires extending in the radial direction of a stator for an electric rotary machine are movably supported therebetween; and a lead wire pressing member disposed so as to be movable between said plane-like members;

whereby said plurality of coil lead wires are pressed in a predetermined gathering direction by said lead wire pressing member so that said plurality of coil lead wires are transformed and gathered into a predetermined shape.

15. An apparatus for treatment of stator coil lead wires for an electric rotary machine according to claim 14, further comprising a fixed member fixedly arranged between said plane-like members, wherein said plurality of coil lead wires are arranged between said fixed member and said pressing member, so that said plurality of coil lead wires are transformed into a predetermined shape by moving said pressing member toward said fixed member.

16. An apparatus for treatment of stator coil lead wires for an electric rotary machine according to claim 15, further comprising a block-like member for pressing and transforming said gathered lead wires in the center axis direction of said stator.

17. An apparatus for treatment of stator coil lead wires for an electric rotary machine, comprising:

opposed cylindrical-surface members arranged so that a plurality of coil lead wires extending in the center axis direction of a stator for an electric rotary machine are movably supported therebetween; and a lead wire pressing member arranged so as to be movable between said cylindrical-surface members;

whereby said plurality of coil lead wires are pressed in a predetermined gathering direction by said lead wire pressing member so that said plurality of coil lead wires are transformed and gathered into a predetermined shape.

18. An apparatus for treatment of stator coil lead wires for an electric rotary machine according to claim 17, further comprising a fixed member fixedly arranged between said cylindrical-surface members, wherein said plurality of coil lead wires are arranged between said fixed member and said pressing member, so that said plurality of coil lead wires are transformed into a predetermined shape by moving said pressing member toward said fixed member.

19. An apparatus for treatment of stator coil lead wires for an electric rotary machine, comprising:

plane-like members arranged so that a plurality of coil lead wires extending in the radial direction of a stator for an electric rotary machine are supported movably therebetween; and lead wire pressing members arranged so as to be movable between said plane-like members;

whereby said plurality of coil lead wires are arranged between said lead wire pressing members and pressed by said lead wire pressing members toward the center portion between said pressing members so that said plurality of coil lead wires are transformed and then gathered into a predetermined shape.

20. An apparatus for treatment of stator coil lead wires for an electric rotary machine according to claim 19, further comprising fixed members arranged in the vicinity of a center portion between said pressing members, whereby said plurality of coil lead wires are arranged between one of said fixed members and one of said pressing members and between the other one of said fixed members and the other one of said pressing members, so that said plurality of coil lead wires are transformed into a predetermined shape by moving said pressing members toward said fixed members respectively.

21. An apparatus for treatment of stator coil lead wires for an electric rotary machine according to claim 20, further comprising a block-like member arranged in the vicinity of the center portion between said pressing members for pressing and transforming said gathered lead wires in the center axis direction of said stator.

22. An apparatus for treatment of stator coil lead wires for an electric rotary machine, comprising:

cylindrical-surface members arranged so that a plurality of coil lead wires extending in the center axis direction of a stator for an electric rotary machine are supported movably therebetween; and lead wire pressing members arranged so as to be movable between said two cylindrical-surface members;

whereby said plurality of coil lead wires are arranged between said lead wire pressing members and pressed by said lead wire pressing members toward the center portion between said pressing members so that said plurality of coil lead wires are transformed and then gathered into a predetermined shape.

* * * * *